G. D. WINCHELL.
Improvement in Oil Cans.
No. 119,441. Patented Sep. 26, 1871.
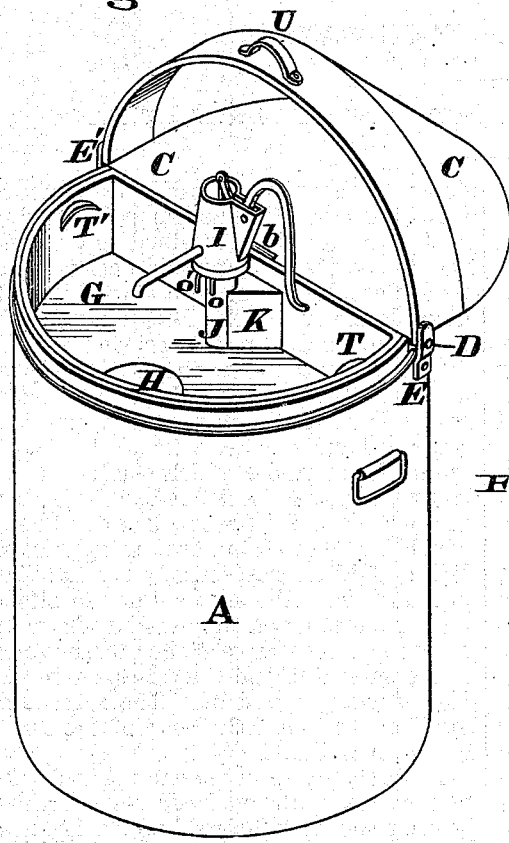
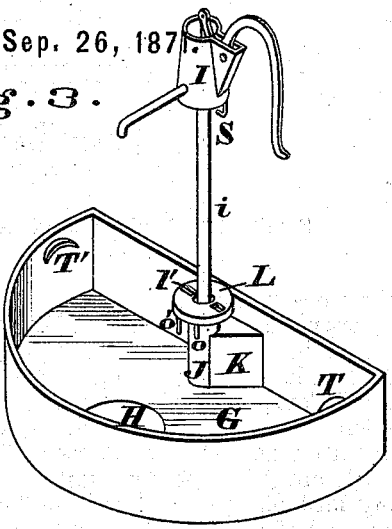
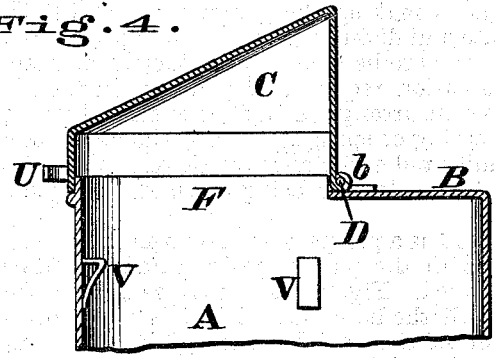
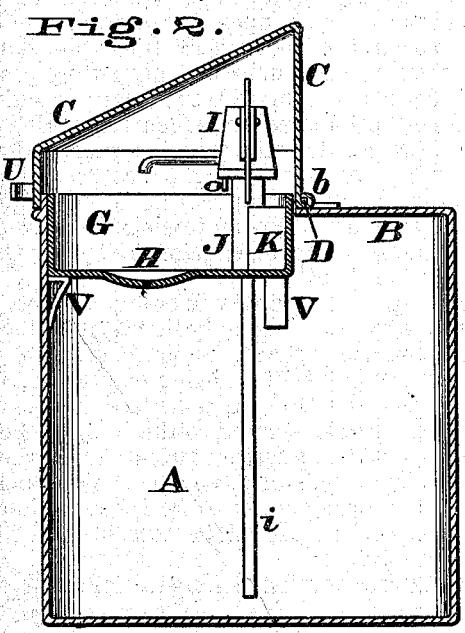
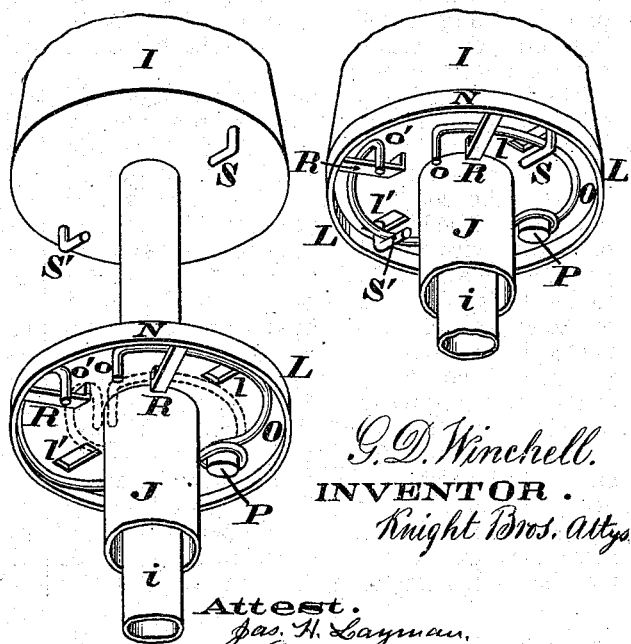
G. D. Winchell
INVENTOR.
Knight Bros. Attys
Attest.
Jas. H. Layman
Walter Allen

119,441

UNITED STATES PATENT OFFICE.

GEORGE D. WINCHELL, OF CINCINNATI, OHIO.

IMPROVEMENT IN OIL-CANS.

Specification forming part of Letters Patent No. 119,441, dated September 26, 1871.

*To all whom it may concern:*

Be it known that I, GEORGE D. WINCHELL, of Cincinnati, in the county of Hamilton and State of Ohio, have invented certain Improvements in Oil-Cans, of which the following is a specification:

This invention relates to that class of receptacles which are employed by retail dealers for containing lard-oil, coal-oil, &c., said vessels comprising a body, a pan, a hinged cover, and a pump; and the first part of my improvement consists in making the pan of segmental form, separate and distinct from the body proper and its lid, so as to be readily lifted therefrom whenever occasion requires. My invention further relates to an arrangement of hooks, slotted plates, and a spring or springs, whereby the pump may be readily and easily removed therefrom, the details of these devices being hereinafter fully described.

Figure 1 is a perspective view of my improved oil-can with the pan in position and the lid or cover raised. Fig. 2 is a vertical section of the same with the lid closed. Fig. 3 is a perspective view of the pan detached. Fig. 4 is a vertical section of the upper portion of the can, the pan being removed and the lid closed. Fig. 5 is a perspective view, on a larger scale, of the pump-coupling viewed from below, the parts being detached. Fig. 6 is a perspective view of the same parts detached.

The body A of the can is a cylindrical vessel, constructed of tin or galvanized iron, and covered at top by segmental plate B, which extends, say, about one-fourth of the distance across the vessel. The body is provided with customary handles $a$. The hinge of the cover C is composed of a stout wire or rod, D, whose outer ends are journaled in ears E E', that are securely attached to the body of the can either by rivets, solder, or otherwise. The mid-length of this bar is supported by an ear, $b$, which is attached to the upper side of plate B. The upper end of the body of the can being partially closed by the plate B leaves a segmental opening, F, which is adapted to receive a detachable pan, G, of corresponding shape, the bottom of said pan resting upon bracket V, and having a sink, H, to receive the drippings from the pump I. This pump may be of any approved construction; but in order that it may be readily coupled to the can, and as easily detached therefrom, I prefer to arrange it in the following manner: The pump is fitted within a neck, J, which is maintained in a vertical position by the brace K, and said neck is surmounted by a plate, L, having two slots, $l\ l'$, and a marginal flange or rim N. Located under the plate L and within the rim N is a spring, O, whose mid-length is secured to a stump, P, which projects downwardly from said plate. The ends of the spring O terminate in the projection $o\ o'$, which serve as handles wherewith said spring is operated. R are guides which confine the spring in its proper place. Attached to the under side of the pump-barrel I are two L-shaped hooks, S S', which are adapted to pass through the slots $l\ l'$. T T' and U are respectively the handles of the pan and lid. The segmental pan sits entirely within the can, and the lid shuts down upon the can-body, irrespective of the presence or absence of the pan. T T' and U are respectively the handles of the pan and lid. The segmental opening F in the top of the body of the can is clearly shown in Fig. 3.

To fit the pump in the can it is only necessary to compress with one hand the spring O to the position shown by dotted lines in Fig. 4, and with the other hand to insert the pipe $i$ of the pump within the neck J, and allow the barrel I to descend until it rests upon the plate L, care being taken that the hooks S S' enter the slots $l\ l'$. As soon as the pump has been thus properly seated upon the plate L the operator quits his hold of the handles $o\ o'$, when the spring O instantly expands, and by engaging under the hooks S S', as seen in Fig. 5, secures the pump in position. The pump can be lifted out of the can in a moment by compressing the handles $o\ o'$ together, so as to disengage the spring O from the handles S S'.

The detachable pan G will be found to be a great convenience, as by simply lifting it out of the can a sufficient opening is obtained in the same to permit a barrel of oil being emptied into it at once. The rod D being journaled in ears E E', which are firmly secured to the body of the can, and said rod being further supported by the central ear $b$, a hinge is thereby produced which can never be sprung so as to be rendered inoperative, neither can the lid be torn from the body of the vessel.

In the drawing the locking device of the pump is shown as consisting of a single spring, O, which is attached to a stump, P; but it is evident that two springs may be employed instead of one, and that their fixed ends may be soldered to the inner side of the rim N.

The plate B not only serves as one of the boundaries of the segmental opening F, which receives the detachable tray or pan, but it also acts as a brace to prevent the top of the can springing out of shape. The pan slips inside the can, and the lid of the latter shuts all inside. If the pan be removed the lid makes a perfect closure in its absence. In either case the vapor leakage is only around the edge of the lid.

I am aware that oil-cans have been made with a cylindrical reservoir supporting a pump-tray, which has a hinged cover; but I will state some features in which my can differs from all others with which I am acquainted. In my invention the hood is attached to the body of the can and has no other relation than a mere lid. It is attached to no other movable part, and does not embarrass the tray by adding to the weight when the latter is to be moved. The partial top to which the cover is hinged is a part of the can top and acts as a brace thereto. As incidental to this mode of construction there is but one outside joint for the leakage of effluvia or vapor, an important matter with some hydrocarbons. In other cans than mine of this class the upper works are upon a tray which merely rests on the top of the can-body and affords a leakage for vapor all around the upper edge of the can, as well as around the edge of the cover. The can being partially closed at top by the brace piece, there is no need for a circular tray to form a lid for the can. My tray is segmental, is large enough for its functions, and is not required to act as a lid, a tray, a stay, and also as a base of support for the other upper works. It is therefore lighter and more compact.

I claim as my invention—

1. The arrangement, substantially as herein described, of the partially open-mouthed oil-can A, fixed brace B, hinged cover C, and detached segmental pan G, said pan being adapted to receive a suitable pump, I, as and for the purpose explained.

2. The combination of the supporting neck J, plate L $l$ $l'$, spring O $o$ $o'$, hooks S S', and pump I $i$, for the object set forth.

In testimony of which invention I hereunto set my hand.

GEO. D. WINCHELL.

Witnesses:
GEO. H. KNIGHT,
JAMES H. LAYMAN. (61)